United States Patent
Kitajima

(10) Patent No.: US 7,184,077 B2
(45) Date of Patent: Feb. 27, 2007

(54) DIGITAL CAMERA

(75) Inventor: Tatsutoshi Kitajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 910 days.

(21) Appl. No.: 10/087,955

(22) Filed: Mar. 5, 2002

(65) Prior Publication Data

US 2002/0126211 A1 Sep. 12, 2002

(30) Foreign Application Priority Data

Mar. 6, 2001 (JP) ............................. 2001-062470

(51) Int. Cl.
H04N 5/225 (2006.01)
H04N 5/76 (2006.01)

(52) U.S. Cl. .................. 348/220.1; 348/231.9

(58) Field of Classification Search ............ 348/231.1, 348/231.7, 231.9, 207.11, 14.04
See application file for complete search history.

(56) References Cited

U.S. PATENT DOCUMENTS

| | | | |
|---|---|---|---|
| 5,109,249 A | 4/1992 | Kitajima | |
| 5,229,805 A | 7/1993 | Kitajima | |
| 5,682,563 A | 10/1997 | Shinohara et al. | |
| 5,748,233 A | 5/1998 | Kitajima et al. | |
| 5,808,681 A | 9/1998 | Kitajima | |
| 5,937,100 A | 8/1999 | Kitajima | |
| 5,959,622 A * | 9/1999 | Greer et al. | 715/719 |
| 6,058,210 A * | 5/2000 | de Queiroz et al. | 382/232 |
| 6,075,562 A | 6/2000 | Sakaguchi et al. | |
| 6,897,891 B2 * | 5/2005 | Itsukaichi | 348/14.1 |
| 2001/0009439 A1 * | 7/2001 | Hwang | 348/231.9 |
| 2002/0024602 A1 * | 2/2002 | Juen | 348/220.1 |
| 2003/0030729 A1 * | 2/2003 | Prentice et al. | 348/220.1 |
| 2003/0112340 A1 * | 6/2003 | Okada et al. | 348/220.1 |

FOREIGN PATENT DOCUMENTS

| JP | 5-161136 | | 6/1993 |
|---|---|---|---|
| JP | 11-234624 | * | 8/1999 |

OTHER PUBLICATIONS

U.S. Appl. No. 10/087,955, filed Mar. 5, 2002, Kitajima.
U.S. Appl. No. 10/801,816, filed Mar. 17, 2004, Kitajima.
U.S. Appl. No. 10/796,022, filed Mar. 10, 2004, Kitajima.
U.S. Appl. No. 10/764,449, filed Jan. 27, 2004, Ojima et al.
U.S. Appl. No. 10/636,849, filed Aug. 8, 2003, Kitajima et al.
Pending U.S. Appl. No. 09/879,041, filed Jun. 13, 2001.
Pending U.S. Appl. No. 10/087,955, filed Mar. 5, 2002.
Pending U.S. Appl. No. 10/230,162, filed Aug. 29, 2002.

* cited by examiner

Primary Examiner—Tuan Ho
Assistant Examiner—Luong T. Nguyen
(74) Attorney, Agent, or Firm—Oblon, Spivak, McClelland, Maier & Neustadt, P.C.

(57) ABSTRACT

A digital camera further includes a compression/multiplex section for providing compressed motion picture data by compressing the respective frames constituting a motion picture in a predetermined operation mode, a communication interface for outputting the compressed motion picture data in an appropriate format, and a picture selection unit which permits a user to select a picture. When the user selects a picture, the compression/multiplex section outputs the selected picture instead of compressed motion picture data.

13 Claims, 1 Drawing Sheet

DIGITAL CAMERA

FIELD OF THE INVENTION

The present invention relates to a digital camera that can record a motion picture and a still picture and that is suitable for capturing a motion picture and a still picture in respective conference halls each employing a television conference system and for displaying and transmitting them.

BACKGROUND OF THE INVENTION

Various television (TV) conference systems, which constructs a network by personal computers (PC) each having a picture input unit connected thereto, have hitherto been proposed.

For example, Japanese Patent Application Laid-Open No. 5-161136 proposes a system in which a motion picture recording camera and a still picture recording camera are separately connected to one set of a wireless picture transmission apparatus disposed in each conference hall to transmit the progress in a conference.

A reason why the motion picture camera and the still picture camera are separately used is that the amount of data of respective recording pictures constituting a motion picture must be suppressed due to the limit of a communication capability for transmitting data through a communication path used generally at present. However, the still picture requires a high resolution because it is often required to print out the still picture, while it is sufficient to employ a camera having a low resolution as the motion picture camera.

Accordingly, it is advantageous if a television conference system can be constructed using one set of a camera capable of capturing a motion picture and a still picture and transmitting them in an appropriate amount of data (or data rates).

On the other hand, as digital still cameras and video cameras come into widespread use, there can be available at present still cameras capable of recording a motion picture of a relatively short time and video cameras having a function for playing back a designated frame of a motion picture as a still picture. However, any of the existing cameras cannot output a motion picture and a still picture at a data rate and in a system that are suitable for a television conference system because they are not manufactured taking it into consideration that they are used in the television conference system.

SUMMARY OF THE INVENTION

It is an object of the present invention to provide a digital camera capable of recording a motion picture and a still picture, accumulating at least still pictures, and outputting the motion picture and the still picture in a format suitable for a television conference system.

According to one aspect of the present invention, there is provided a digital camera suitable for a television conference system. The digital camera 1 includes a motion picture recording unit which obtains a motion picture by continuously recording it, and a still picture recording/storage unit composed of a still picture recording unit which records a still picture by releasing a shutter and a picture storage unit which stores the still picture. The digital camera further includes a compression unit which compresses the respective frames constituting the motion picture and provides compressed motion picture data in a predetermined operation mode, an interface unit which outputs the compressed motion picture data in an appropriate format, and a picture selection unit which permits a user to select a picture by any of the recording of a still picture by releasing the shutter and the designation of a picture stored in the picture storage unit, wherein the compression unit includes a selected picture output unit which provides, when the user selects a picture by the picture selection unit, the selected picture as it is without compressing it instead of the compressed motion picture data.

Further, the digital camera according to another aspect of the present invention includes an audio input/storage unit which inputs audio as audio data and stores it and a still picture recording/storage unit composed of a still picture recording unit which records a still picture by releasing a shutter and a picture storage unit which stores the still picture and is suitable for a television conference system. The digital camera includes an interface unit which outputs the audio data to the outside in an appropriate format in a predetermined operation mode, a picture selection unit which permits a user to select a picture by any of the recording of a still picture by releasing the shutter and the designation of a picture stored in the picture storage unit, and a unit which outputs, when the user selects a picture by the picture selection unit, the selected picture to the outside in an appropriate format instead of the audio data.

Other objects and features of this invention will become understood from the following description with reference to the accompanying drawing.

DETAILED DESCRIPTIONS

Figure 1:
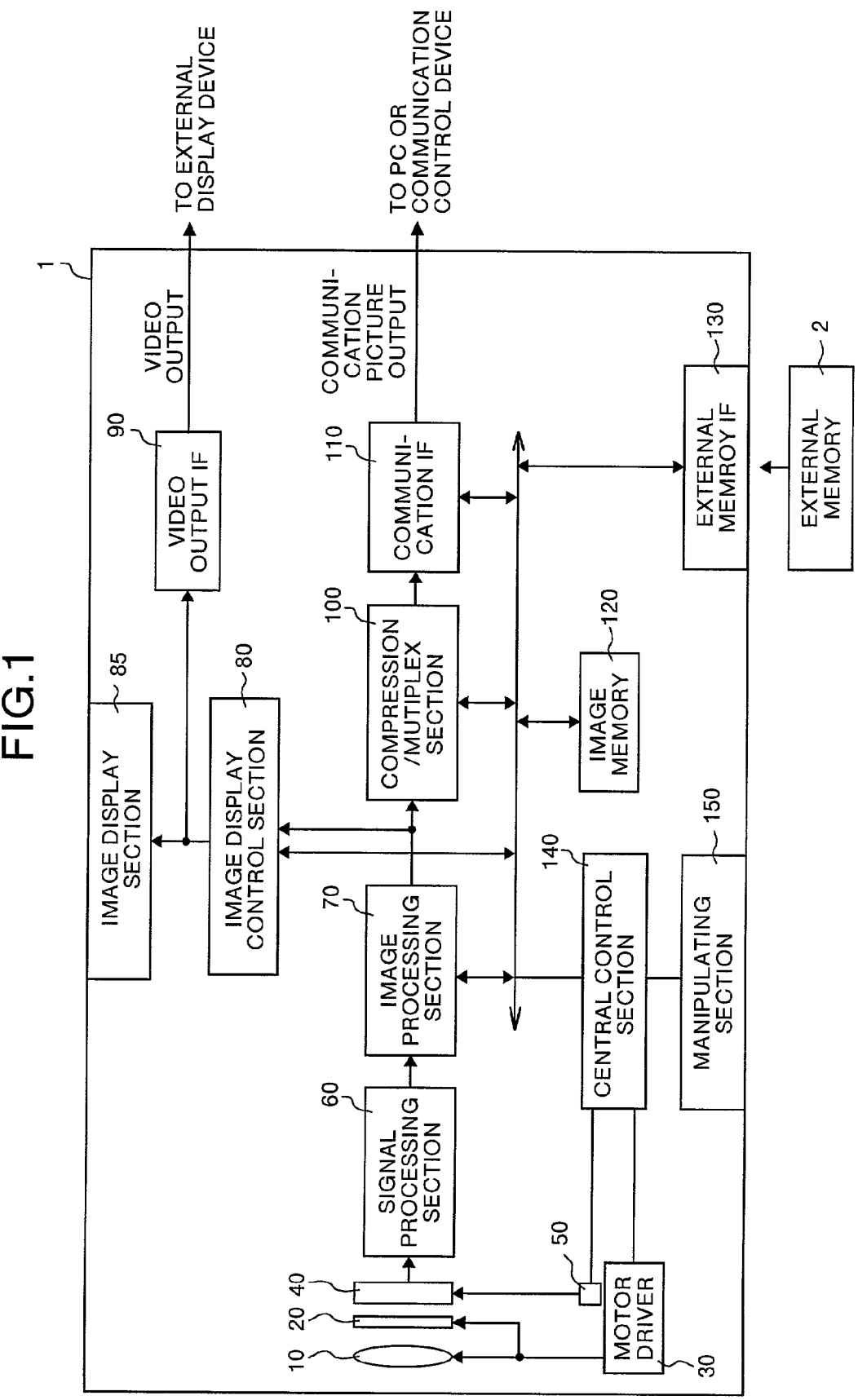
FIG. 1 is a schematic block diagram which shows a concept of a digital camera according to an embodiment of the present invention.

An embodiment of the present invention will be described below as well as the present invention will be described in detail with reference to the accompanying drawing.

FIG. 1 is a schematic block diagram which shows a concept of a digital camera according to an embodiment of the present invention. The digital camera 1 of FIG. 1 includes a lens unit 10, a mechanical shutter 20, a motor driver 30 for driving respective motors that drive the lens and the shutter 20 of the lens unit 10, a charge coupled device (CCD) 40 having a sufficient number (for example, 1280×960) of pixels as a still camera, a CCD drive circuit 50, a signal processing section 60 for performing the correlation double sampling and the A/D conversion (conversion from an analog signal to a digital signal) of CCD signals, a picture processing section 70 for converting the A/D converted digital signals into luminance Y and color difference U and V signals, a picture display control section 80 for displaying a recorded motion picture and an accumulated and selected still picture, a picture display section 85 for displaying the output from the picture display control section 80, a video output interface (IF) 90 for outputting the signals from the picture display control section 80 to an external video monitor, a compression/multiplex section 100 for compressing a recorded motion picture (and also still pictures having been accumulated and selected, respectively depending upon an embodiment) at a designated data rate in a predetermined format and for multiplexing, when there is a still picture to be transmitted, the compressed motion picture and the still picture, a communication interface (IF) 110 for outputting the picture output signals from the compression/multiplex section 100 to a personal computer (PC) or a communication controller for controlling communication with other conference hall, a picture memory 120 for temporarily storing a still picture, an external memory interface (IF) 130 for connecting a detachable external memory 2 that accumulates pictures, a central control section 140 for controlling the digital camera 1 in its entirety, and a manipulating section 150 having various switches through which an operator manipulates the digital camera 1.

Among the above constitutional elements, the elements 10 to 90, the picture memory 120, and the external memory interface 130 are similar to those of an ordinary video camera or still camera, and thus the detailed description thereof is omitted.

When it is premised that the output from the picture display control section 80 is necessarily displayed on an external display device, the picture display section 85 can be omitted.

Further, the video output interface 90 is not necessary when it is taken into consideration that the digital camera 1 is used only for a television conference because the personal computer or the communication controller connected to the digital camera 1 has a function for expanding and displaying the picture output from the digital camera 1. However, it is preferable that the digital camera 1 includes the video output interface 90 in consideration that it is also used as an ordinary still camera.

The personal computer or the communication controller (not shown) is connected to the personal computer or the communication controller of each conference hall other than that of FIG. 1 through a communication unit, in addition to the digital camera 1 of FIG. 1, and controls the display of the picture transmitted from each conference hall according to an instruction from a user. The camera 1 may be connected to the personal computer or the communication controller through a cable or by air when the cable is employed, a universal serial bus (USB), for example, can be used.

When the camera 1 is utilized in a television conference by connecting it to the personal computer or the communication controller, first, the user sets an operation mode to a television conference mode by a predetermined switch (not shown) of the manipulating section 150.

An operation of the digital camera 1 in the television conference mode will be described below.

The camera 1 ordinarily records a motion picture in the television conference mode, compresses each recorded frame at a rate designated by the compression/multiplex section 100, and outputs compressed picture data through the communication interface 110.

However, the picture that is transmitted and played back has a low resolution, and there arises an instance that the subjects in the conference must be recorded as data having a high resolution. In this instance, in the television conference mode according to the present invention, even if the continuous data of a motion picture is being transmitted, a picture at the moment the user depresses a release button (this picture is referred to as a selected picture) is stored in the picture memory 120 without being compressed and at the same time is output through the communication interface 110. Further, when the user designates anyone of the still pictures previously recorded and stored in the picture memory 120, the designated picture (which is also referred to as a selected picture) is also output through the communication interface 110. It is needless to say that a picture, which is selected from the pictures stored in the external memory 2, can be output. Further, the selection of a picture may be interactively carried out making use of the picture display section 85.

Note that, in an ordinary digital camera, a recording medium insertion detecting switch is checked regularly to protect data, and when no recording medium is inserted or it is intended to pull out a recording medium, it is detected and the operation of the camera is stopped. It is preferable in the present invention that the user set the camera such that a recording medium can be replaced in the mode in which the camera is transmitting recorded data to the outside (television conference mode). With this configuration, it is possible to replace the external memory 2 and to transmit a necessary still picture even if the television conference is being carried out.

Simultaneously with the completion of transmission of the selected picture, the compression/multiplex section 100 resumes the transmission of the motion picture being recorded. This transmission method can transmit a still picture promptly because it transmits one frame of the still picture (selected picture) at a time by temporarily interrupting the transmission of the motion picture. However, the motion picture is discontinued on a receiver side because it is not transmitted while the still picture is being transmitted.

To solve this point, a selection button is provided with the manipulating section 150 to designate the rate (i.e., the selected picture transmission rate) of the amount (i.e., the selected picture transmission amount) of a selected picture, which is transmitted during a still picture transmission period from the start of transmission of the selected picture to the end of transmission thereof to the total amount (i.e., the total transmission amount) of the selected picture and a motion picture which are transmitted during the above period so that the user can select a desired selected picture transmission rate. When this rate is 100%, it corresponds to the block transmission of the one frame of the selected picture described above. When the selected picture transmission rate is other than 100%, the compression/multiplex section 100 outputs one frame of a still picture and a motion picture by time-division multiplexing them.

Further, it is also possible for the central control section 140 to control the selected picture transmission rate instead of that the user designates it. That is, a plurality of levels of selected picture transmission rates are prepared, and when the data amount of selected pictures is small, the transmission rate of a continuous picture is increased (i.e., the level of the selected picture transmission rate is reduced) so as to secure the smooth movement of a motion picture. In contrast, when the data amount of the selected pictures is large, the transmission rate of the continuous data is reduced (i.e., the level of the selected picture transmission rate is increased) so that the data transmission time of the selected pictures can be set within a predetermined range, while the motion picture is made awkward.

It is preferable that the picture processing section 70 insert a code or data to a predetermined position of a recorded picture to discriminate the recorded picture from a motion picture when it is a still picture. With this configuration, a still picture can be easily discriminated from a motion picture, and thus when pictures including a code showing that they are still pictures are received, it is sufficient to repeatedly display the pictures regardless of that they are played back in the digital camera 1 or at the destination to which they are transmitted. Further, the picture processing section 70 of the camera 1 that transmits still pictures inserts a code or data which shows the stop of the still pictures to a predetermined position of a motion picture at the timing at which the play back of the still pictures is stopped. With this configuration, it is sufficient for the camera that is playing back the still pictures to repeat the play back of them until it receives the motion picture having the code or the data indicating the stop of the still pictures.

When the compression/multiplex section 100 has a function for controlling a compression rate, it may compress a continuous picture at a high compression rate and a still picture or a selected picture at a low compression rate. The compression/multiplex section 100 may employ various types of compression methods as shown below, in addition to compression methods of high efficiency, for example, a Moving Picture Experts Group (MPEG), and the like applied to a motion picture.

(1) Method of Thinning Out the Pixels of Motion Picture

The number of pixels of a full picture as it is recorded can be reduced to, for example, about 320×240 pixels by reducing the number of lines thereof in horizontal and vertical directions. In this case, vertical lines may be thinned out when the picture is recorded and horizontal lines maybe thinned out by the compression/multiplex section 100.

(2) Method of Gray Scaling or Binarizing Selected Picture

A recorded picture is processed and made to Y (luminance) and U and V (color differences). Y is 8-bit multi-valued data having a value of 0 to 255. The data rate of a still picture, which need not be color, of still pictures can be reduced as compared with the data rate thereof when it is color by outputting only the Y data thereof. Further, the compression/multiplex section 100 may be provided with a binarizing function. That is, each Y data is converted into binary data of "1" and "0" using the average luminance of an overall screen as a threshold value. For example, when a picture may be a binary picture such as a document, a drawing, a line drawing, and the like, the picture is transmitted as a selected picture after it is binarized, thereby the data rate thereof can be more reduced than gray scaling.

While the technology for reducing the data rate has been described above, there is also an instance of a picture of high quality is necessary. For this purpose, the digital camera 1 may be arranged as described below. That is, a piezoelectric element (not shown) capable of moving a recording element upward and downward is provided, and the charge coupled device 40 is moved upward by one pixel after a first picture is recorded and then a second picture is recorded. Since the charge coupled device 40 has R, G and B filters disposed thereon in a checkered pattern, information of respective colors is not obtained over the entire pixels. The color information of the entire pixels is ordinarily obtained by an interpolation. However, since an interpolation formula has a low-pass filter (LPF) effect, a picture is made unsharp thereby. To cope with this problem, when the second picture, which is recorded by being dislocated by one pixel, is used, a G signal that greatly contributes to a Y signal can be obtained therefrom as to all the pixels, thereby a picture of high resolution can be obtained without the need of using the interpolation as to Y. When this picture data is transmitted, data the quality of which is higher than that of the pixel size of the charge coupled device 40 can be transmitted. Accordingly, even if the charge coupled device has a small number of pixels and is used for a motion picture, it can create and transmit a picture of high resolution.

The digital camera 1 may further include a picture input interface (not shown) for receiving picture data from an external device, a separator (not shown) for separating a still picture (i.e., a selected picture) from the received picture data and for storing it in the picture memory 120, an expander (not shown) for expanding the picture data having passed through the separator (i.e., a motion picture), and a unit through which the user designates which of the output from the compression/multiplex section 100 and the received picture data is to be displayed so that a continuous picture from the outside and a selected picture can be displayed or can be accumulated and displayed on the picture display section 85. When the camera 1 has the structure described above and is used by one individual, it is not necessary for an external personal computer or communication controller itself to have a function for expanding and displaying a picture. The user can selectively observe a continuous picture being transmitted and a continuous picture from other person.

Further, the provision of a microphone (not shown), an analog processing section (not shown) for restricting the band of microphone input signals and for amplifying the signals, and further an encoder for encoding the output from the analog processing section, instead of or in addition to the motion picture recording function permits the voice of the user to be stored in the external memory 2 and to be output through the communication interface. In this configuration, the audio data input from the microphone may be ordinarily output through an audio interface, and when the user selects a picture, the selected picture may be output to the outside through the communication interface 110 instead of the audio data, in the television conference mode. Alternately, when the user selects the picture, the audio data and the selected picture may be output using time division. As a method of selecting a picture, there is contemplated a method of recording a still picture by releasing the shutter and a method of selecting a picture from the pictures stored in the picture memory 120 or in the external memory 2. Ordinarily, when a still picture, which is selected while a motion picture is being continuously transmitted, has a large amount of data, it is also possible to complete the transmission of the still picture data at an early time by changing the transmission of the motion picture to the transmission of only audio instead of transmitting the motion picture. While a motion picture and a still picture are transmitted through the same communication path using time division in the aforementioned embodiment, an interface and a communication path may be provided with each of the motion picture and the still picture.

Some kind or another memory card is used as the external memory 2 at present. However, when a small optical disc having a fast access speed and a large capacity can be utilized in the future, it is possible to record not only still pictures but also motion pictures having a certain degree of length in a compressed format (at this time, the distinction between a video camera and a digital still camera disappears in a general user market). In this case, it is also possible to select and transmit a motion picture recorded in the external memory 2 instead of a motion picture being recorded at a time necessary in a conference.

The above description only refers to an example of the embodiment to explain the present invention. Therefore, it is easy for persons skilled in the art to make various modifications, corrections, and additions to the aforementioned embodiment according to the spirit or the principle of the present invention. Thus, the present invention should be interpreted according to only the claims without being prepossessed by the embodiment described above.

According to the present invention, it is possible for only one set of a camera to easily transmit not only real-time continuous data, while its resolution is low, but also data of high resolution including detailed information, when necessary, to an external device without discontinuing motion picture data. Therefore, the present invention is useful in a television conference system, and the like. Further, the provision of the data compression rate control function with the apparatus permits highly compressed data to be used in the low resolution data according to claim 1 and data having a high compression rate to be used in the high resolution data according to claim 1. Further, the provision of the picture size change function with the apparatus permits picture size reduced data to be used in the low resolution data according to claim 1 and data without the reduction of picture size to be used in the high resolution data according to claim 1. The amount of data can be reduced by gray scaling a selected picture. The amount of data can be more reduced by binarizing a selected picture. A selected picture can be selected from a motion picture that is being recorded. A selected picture can be selected from the still pictures stored in the picture storage unit. It is possible to replace a detachable external memory with another external memory during a television conference and to select a picture from the still pictures stored therein and to transmit the selected picture. Even if the charge coupled device has the small number of pixels and is used for a motion picture, the device can create and transmit a picture of high resolution. Since the rate of a selected picture to motion picture data can be changed, the camera can slowly transmit a selected picture on a background while giving weight to a real-time picture or can transmit a selected picture at high velocity by reducing the data rate of a motion picture. The camera can secure the quality level of real-time motion picture data and the transmission time performance of a selected picture by checking the data size of the selected picture and by controlling the selected picture transmission rate. The provision of the display unit with the camera main body permits motion picture data, a selected picture and data received from the outside to be selectively displayed thereon. Accordingly, the operability of the camera main body and the information recognizing property of the data received from the outside can be improved without depending upon the display on an external device. Further, it is also possible to transmit picture data in parallel with a conference carried out by audio.

The present document incorporates by reference the entire contents of Japanese priority document, 2001-062470 filed in Japan on Mar. 6, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera, comprising:
    a motion picture recording unit configured to obtain a motion picture by continuously recording the motion picture, and a still picture recording/storage unit composed of a still picture recording unit configured to record a still picture by releasing a shutter and a picture storage unit configured to store the still picture;
    a compression unit configured to compress the respective frames constituting the motion picture and provides compressed motion picture data in a predetermined operation mode;
    an interface unit configured to output the compressed motion picture data in an appropriate format and to output the still picture;
    a multiplex unit configured to output the compressed motion picture and the still picture by time-division multiplexing; and
    a picture selection unit configured to permit a user to select a picture by any of the recording of the still picture by releasing the shutter and the designation of a picture stored in the picture storage unit,
    wherein the compression unit comprises a selected picture output unit configured to provide, when the user selects the picture by the picture selection unit, the selected picture without compressing the selected picture instead of the compressed motion picture data.

2. A digital camera according to claim 1, wherein the selected picture output unit comprises a still picture compression unit configured to compress the selected picture at a still picture compression rate that is lower than the compression rate of the compression unit to thereby provide the selected picture by compressing the selected picture at the still picture compression rate instead of the compressed motion picture data.

3. A digital camera according to claim 1, wherein the compression unit configured to provide the compressed motion picture data further comprises a picture reduction unit configured to thin out the pixels of the respective frames by a predetermined procedure.

4. A digital camera according to claim 2, wherein the selected picture output unit further comprises a gray scaling unit configured to gray scale color picture data and a unit configured to allow the user to select any of the still picture compression unit the selected picture and the gray scaling unit.

5. A digital camera according to claim 2, wherein the selected picture output unit further comprises:
    a binarizing unit configured to binarize picture data; and
    a unit configured to allow the user to select any of the still picture compression unit and the binarizing unit in the compression of the selected picture.

6. A digital camera according to claim 1, wherein the picture selection unit comprises the shutter, a release button of the shutter, and a motion picture selection unit configured to use a picture recorded in relation to the manipulation of the release button manipulated by the user in the predetermined operation mode as the selected picture.

7. A digital camera according to claim 1, wherein the picture selection unit comprises a unit configured to allow the user to select the still picture from still pictures stored in the picture storage unit.

8. A digital camera according to claim 7, further comprising an external storage device interface unit configured to allow data to be transmitted between a detachable external storage device and the picture storage unit biaxially as well as the external storage device interface unit configured to allow the detachable external storage device to be mounted and dismounted in a predetermined operation mode.

9. A digital camera according to claim 1, wherein the still picture recording unit and the motion picture recording unit comprise a unit configured to obtain the selected picture by combining two pictures recorded continuously in time.

10. A digital camera according to claim 1, further comprising a selection button configured to permit the user to designate a selected picture transmission rate of a selected picture transmission amount of the selected picture, the selected picture being transmitted during a still picture output period from the start of output of the selected picture to the end of output thereof to a total transmission amount of the selected picture and the motion picture which are output during the selected picture output period, wherein
    the multiplex unit is further configured to perform time-division multiplexing of the selected picture and the motion picture so that a designated selected picture transmission rate is achieved when the user selects a picture by the picture selection unit at a time the selected picture transmission rate is designated to other than 100%.

11. A digital camera according to claim 1, wherein the multiplex unit is included in the compression unit, and is further configured to output, when the user selects the picture by the picture selection unit, the selected picture by time-division multiplexing the selected picture and the compressed motion picture data, and the multiplex unit comprises a unit configured to increase the transmission rate of the compressed motion picture data when the data amount of the selected picture is relatively small and decreases the transmission rate of the compressed motion picture data when the data amount of the selected picture is relatively large.

12. A digital camera according to claim 1, further comprising:

a picture display unit configured to display the picture;

a picture input unit configured to receive picture data from an external device;

a separation unit configured to separate a selected still picture from the received picture data and stores the selected still picture in the picture storage unit, and an expansion unit configured to expand picture data that passed through the separation unit; and a unit configured to cause the user to designate which of the output from the compression unit and the received picture data is to be displayed, wherein the user can selectively observe the picture data being transmitted and the received picture data.

13. The digital camera according to claim 1, wherein the interface unit is further configured to output the still picture in an uncompressed format.

* * * * *